Oct. 9, 1956

J. F. BIVINS 2,766,333

DISINFECTING DEVICE FOR TELEPHONES

Filed Aug. 20, 1953

2 Sheets-Sheet 1

James F. Bivins
INVENTOR.

BY Clarence A. O'Brien
and Harvey B. Jacobson
Attorneys

Oct. 9, 1956 J. F. BIVINS 2,766,333
DISINFECTING DEVICE FOR TELEPHONES
Filed Aug. 20, 1953 2 Sheets-Sheet 2
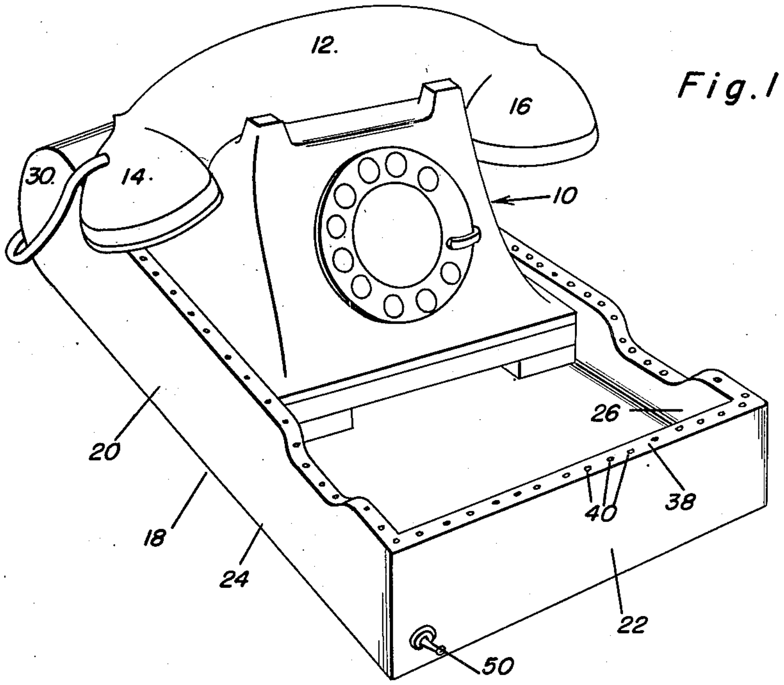
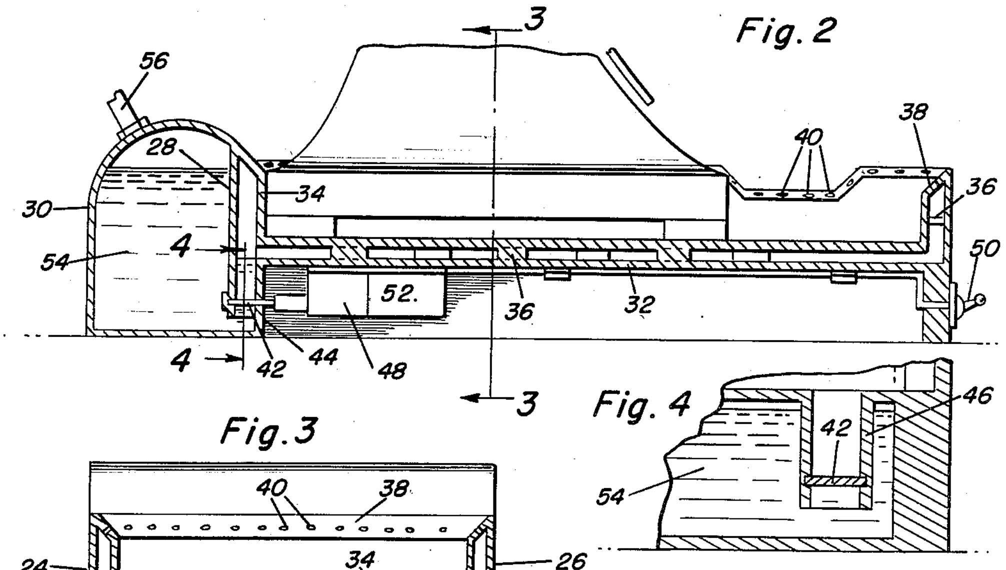
Fig. 2, Fig. 4
Fig.3
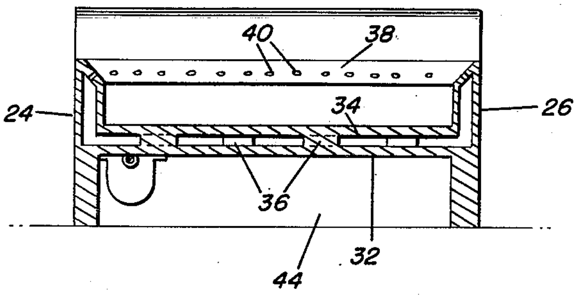
James F. Bivins
INVENTOR.
BY Clarence A. O'Brien and Harvey B. Jacobson
Attorneys

United States Patent Office 2,766,333

Patented Oct. 9, 1956

2,766,333

DISINFECTING DEVICE FOR TELEPHONES

James F. Bivins, East Pittsburgh, Pa.

Application August 20, 1953, Serial No. 375,544

3 Claims. (Cl. 179—185)

This invention relates to a disinfecting device adapted for utilization on various types of telephones, and more particularly to an arrangement of parts whereby a disinfecting fluid is sprayed upon the various parts of a telephone.

Disease can be spread by adherence of germs, bacteria and viruses, to the various portions of a telephone, which are positioned by the user in the immediate vicinity of his ears, nose, and mouth when in use. Inasmuch as a previous user of the telephone may have expelled germs onto the surface of the mouthpiece, earpiece, or other parts of the telephone, it is highly desirable to provide means for preventing spread of disease and infections by effectively disinfecting the telephone using positive means such as a spray of a germicidal disinfectant.

The construction of this invention features means for intermittently spraying a disinfectant over the various portions of the telephone likely to have germs thereon. Means are provided for forcing a disinfectant fluid through apertures in a hollow perforated member so that the fluid is sprayed over the various parts of the telephone.

When utilized in combination with a "French" type telephone, an open-type top receptacle is utilized having apertures in the beveled peripheral edge thereof whereby the spray of disinfectant is directed over the entire telephone. When the invention is utilized in the combination with a public telephone of the wall type, there is provided a hollow perforated member which is arranged in the immediate vicinity of the cradle, so that when the handset is placed on the cradle, the handset can be automatically sprayed with a suitable disinfectant fluid.

Still further objects and features of the invention reside in the provision of a disinfecting device for telephones that is strong and durable, comparatively simple in construction, and manufacture, capable of being readily produced out of various materials, and which insures a highly sanitary telephone for subsequent use.

These, together with various other objects of this invention which will become apparent as the following description proceeds, are obtained by this disinfecting device for telephones, preferred embodiments of which have been illustrated in the accompanying drawings, by way of example only, wherein:

Figure 1 is a perspective view showing the telephone disinfecting device as utilized in combination with a "French" type telephone;

Figure 2 is a vertical sectional view of the disinfecting device;

Figure 3 is a vertical sectional view taken along the line of plane 3—3 in Figure 2 and illustrating in detail the arrangement of the beveled peripheral edges of the disinfecting device;

Figure 4 is a sectional detailed view as taken along the plane of line 4—4 in Figure 2;

Figures 5, 6, 7, 8, 9:
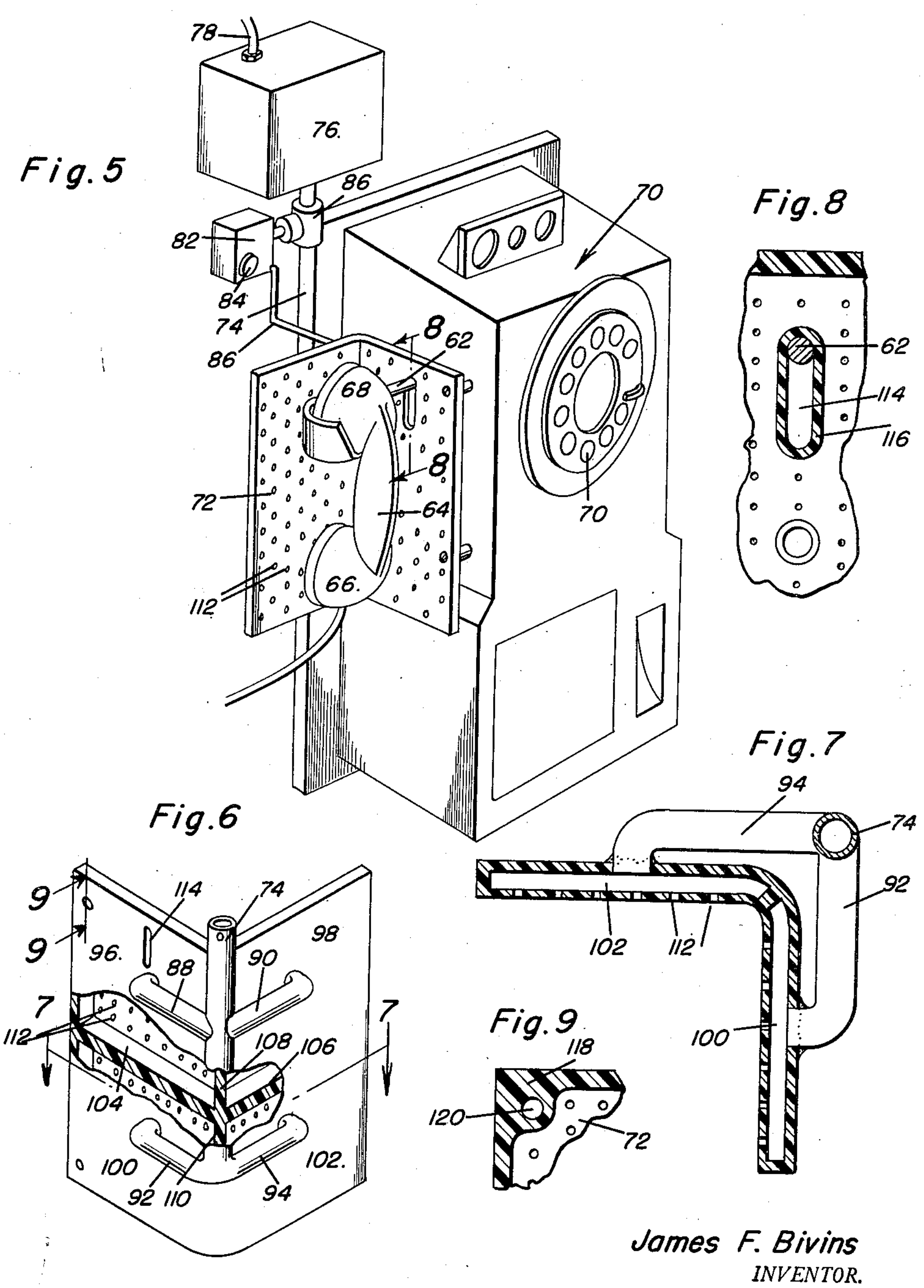
Figure 5 is a perspective view showing the arrangement of parts of the disinfecting device when modified for use on a wall type telephone.
Figure 6 is a rear perspective view illustrating the construction of the hollow perforated member utilized in spraying the disinfecting fluid on the telephone handset with parts thereof being broken away to show other parts in greater detail.
Figure 7 is an enlarged horizontal sectional view as taken along the plane of line 7—7 in Figure 6, and illustrating the trunks of the conduit for supplying fluid to the various compartments of the hollow perforated member.

Figure 8 is an enlarged sectional detailed view taken along the plane of line 8—8 of Figure 5 and illustrating the bulkhead or wall in the peripheral edge of the slot through which the cradle of hook extends; and Figure 9 is a sectional detailed view as taken along the plane of line 9—9 in Figure 6 and illustrating the arrangement of parts whereby the hollow perforated member may be secured to the other elements of the telephone.

With continuing refeernce to the accompanying drawings, wherein like reference numerals designate like parts throughout the various views, and with particular attention to Figures 1 through 4, reference numeral 10 is used to generally designate a telephone of the "French" type or cradle type having a handset 12 including a mouthpiece 14 and earpiece 16. The disinfecting device comprising the present invention is generally indicated at 18 and includes an open top receptacle 20 having a front 22, sides 24 and 26, and a rear 28 having attached thereto a tank 30 of any convenient configuration. The bottom 32 of the receptacle 20 is spaced from the bottom edges of the front, sides and rear. An inner disc-shaped member 34 spaced from yet conforming in configuration to the front 22, sides 24 and 26, rear 28 and bottom 32 is secured and in spaced relationship by means of spaces as at 36. The spaces 36 do not prevent ready flow of fluid between the outer portions of the front, sides and rear from the disc-shaped member 34. The receptacle 20 is provided with a downwardly and inwardly beveled peripheral edge 38 extending therearound which has a series of spaced perforations 40 therein through which fluid can be braved.

Communication between the tank 30 and the receptacle 20 is normally prevented by a plate 42 extending between the rear 28 and the lower portion 44 of the tank 30. The plate 42 closes a conduit 46 communicating with the outer receptacle 20 and is controlled by a solenoid 48. A switch 50 is mounted on the front wall 22 for controlling the operation of the solenoid 48 and a timer 52 is provided for holding the solenoid 48 energized for a predetermined period of time, thereby permitting fluid such as at 54 within the tank 30 to be forced into the hollow receptacle 20 and out of the perforations 40 to thereby spray the telephone 10. A switch 50 is of course electrically operably connected to the solenoid 48 and to a suitable source of electrical power. The tank 30 may be connected by means of a conduit 56 to a suitable source of pressure for the disinfectant fluid 54 such as a tank of compressed air, or the like. Optionally, the tank 30 may be constructed with a sufficient head to insure spray of the liquid 54 through the apertures 40.

Referring now to the embodiment as shown in Figures 5 through 9, it will be noted that herein there is illustrated a wall type telephone generally designated by reference numeral 60. This wall type telephone is provided with a cradle or hook 62 from which the handset 64 can be expended when not in use, the handset 64, including a mouthpiece 66 and an earpiece 68. A dial 70 is provided for the telephone 60.

The disinfecting device when used in combination with the wall type telephone indicated at 60 comprises a substantially angular hollow perforated plate 72 which is V-shaped in cross-section and which is connected by means of a suitable conduit 74 to a tank 76 of disinfectant fluid. The tank 76 may be connected by the conduit 78 to an external source of pressure or may be of sufficient height above the hollow perforated member 72 so as to assure a sufficient head of fluid. A valve 80 of conventional design is controlled by a solenoid within a control box 82. A manually operable switch 84 of the push-button variety, or of any other convenient type may be located within the control box 82. However, a micro-switch connected by suitable conductors 86 to the control box 82 is provided for automatically effecting operation of the solenoid and hence of the valve 80. The microswitch is positioned for actuation by the hook or cradle 62 when such is lowered from the position such as illustrated in Figure 5 when first placed into the cradle, during the lowering of the cradle 62 so as to open the telephone lines as is conventional.

The conduit 74, through which the disinfectant fluid in the tank 76 flows, may have a branch extending over the dial 70 for spraying the dial if such is desired. The conduit 74 has trunks 88, 90, 92 and 94 which extend into the various compartments 96, 98, 100 and 102 formed in the angular shape hollow perforated member 72. The compartments 96, 98, 100 and 102 are formed by imperforate walls 104, 106, 108 and 110 formed within the member 72. These walls divide the member 72 into the plurality of compartments for the purpose of preventing an overflow of fluid into any one portion of the member 72. The member 72 is provided with a plurality of perforations 112 through which the disinfectant fluid from the tanks 76 may be sprayed so as to completely cover the handset 64 to disinfect the handset. The member 72 has a slot 114 therethrough which has a peripheral wall 116 for closing off the compartment 96 and preventing any fluid from passing out into the slot 114. This maintains pressure on the fluid and directs it out of the apertures 112. The corners of the member 72 are fashioned out of solid material as indicated at 118 and have apertures 120 therethrough, through which bolts extend for securing the device to the telephone or to any other convenient supporting member.

From the foregoing, the construction and advantages of these disinfecting devices for telephones are readily apparent, further description is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A disinfecting device for telephones comprising a tank of disinfectant fluid, a hollow perforated member for spraying said disinfectant fluid over a telephone, a conduit between said tank and said perforated member, valve means selectively preventing flow of fluid through said conduit, and switch means for controlling said valve means, said hollow perforated member comprising a receptacle for receiving a telephone, the upper peripheral edges of said receptacle being angularly beveled and having perforations therethrough for directing a spray of fluid over a telephone situated in said receptacle.

2. A disinfecting device for telephones comprising a tank of disinfectant fluid, a hollow perforated member for spraying said disinfectant fluid over a telephone, a conduit between said tank and said perforated member, valve means selectively preventing flow of fluid through said conduit, and switch means for controlling said valve means, said hollow perforated member comprising a receptacle for receiving a telephone, the upper peripheral edges of said receptacle being angularly beveled and having perforations therethrough for directing a spray of fluid over a telephone situated in said receptacle, means for forcing the fluid in said tank through the perforations in said hollow perforated member, said switch means including a manually operable switch for actuating a solenoid, said solenoid controlling the position of said valve means.

3. A disinfecting device for telephones comprising a tank of disinfectant fluid, a hollow perforated member for spraying said disinfectant fluid over a telephone, a conduit between said tank and said perforated member, valve means selectively preventing flow of fluid through said conduit, and switch means for controlling said valve means, said hollow perforated member comprising a receptacle for receiving a telephone, the upper peripheral edges of said receptacle being angularly beveled and having perforations therethrough for directing a spray of fluid over a telephone situated in said receptacle, means for forcing the fluid in said tank through the perforations in said hollow perforated member, said switch means including a manually operable switch for actuating a solenoid, said solenoid controlling the position of said valve means, said switch means further including a timer for controlling the duration of operation of said disinfecting device.

References Cited in the file of this patent

UNITED STATES PATENTS

| | | |
|---|---|---|
| 1,513,768 | Stowell | Nov. 4, 1924 |

FOREIGN PATENTS

| | | |
|---|---|---|
| 790,237 | France | May 18, 1935 |